PHONOGRAPH TURNTABLE UNITS

Filed Aug. 18, 1960 2 Sheets-Sheet 1

INVENTOR.
James C. Hilton
BY Philip A. Friedell
Attorney

March 12, 1963 J. C. HILTON 3,081,092

PHONOGRAPH TURNTABLE UNITS

Filed Aug. 18, 1960 2 Sheets-Sheet 2

INVENTOR.

James C. Hilton

BY Philip A. Friedell

Attorney

United States Patent Office 3,081,092

Patented Mar. 12, 1963

3,081,092

PHONOGRAPH TURNTABLE UNITS

James C. Hilton, 4015 Coolidge Ave., Oakland, Calif.

Filed Aug. 18, 1960, Ser. No. 50,501

3 Claims. (Cl. 274—9)

This invention relates to improvement in phonograph turntable units and provides a new method of driving the turntable including a dual action speed change with simultaneous connection and disconnection of the dial speed change drives when operation of the turntable is to be initiated or terminated, with the turntable being accelerated from, and decelerated to, to point of connection and disconnection through the medium of a manually operable speed control lever. Furthermore, friction between the drive wheel and the turntable is increased as the speed is increased for more efficient timing.

As is well known, phonographic turntables are customarily driven through the depending flange, in which method adjustment is limited to tapered or stepped drive shafts or spindles or variable speed motors, adjustment of the drive wheel having no effect on the rotational speed of the turntable, however, this invention provides for adjustment simultaneously of the drive wheel toward and from the axis of the turntable with the drive wheel cooperative with the undersurface, and, for adjustment of the drive wheel on a conical or tapered spindle or shaft, thus providing a compound speed adjustment through a single manually adjustable member.

The objects and advantages of the invention are as follows:

First, to provide a phonograph turntable unit with driving means cooperative with the undersurface of the turntable for varying the speed of the turntable through adjustment of the driving means relative to the axis of the turntable.

Second, to provide means as outlined for manually adjusting the driving means relative to the axis of the turntable for adjusting the speed thereof.

Third, to provide a phonograph turntable unit as outlined with a motor having a tapered spindle, with the driving means including a drive wheel which is simultaneously cooperative with the undersurface of the turntable and with the tapered spindle and simultaneously adjustable relative to the base of the spindle and axis of the turntable for dual acting changes in speed of the turntable.

Fourth, to provide a phonograph turntable unit as outlined with manual adjusting means for adjusting the speed of the turntable and having an off position with the turntable decelerated to, and accelerated from, said off position.

Fifth, to provide a phonograph turntable unit as outlined in which the drive wheel is retracted in clearing relation to the turntable and to the spindle when the manual adjusting means is moved to the off position, and including means for releasably securing the adjusting means in the off position.

In describing the invention reference will be had to the accompanying drawings, in which.

Figure 1:
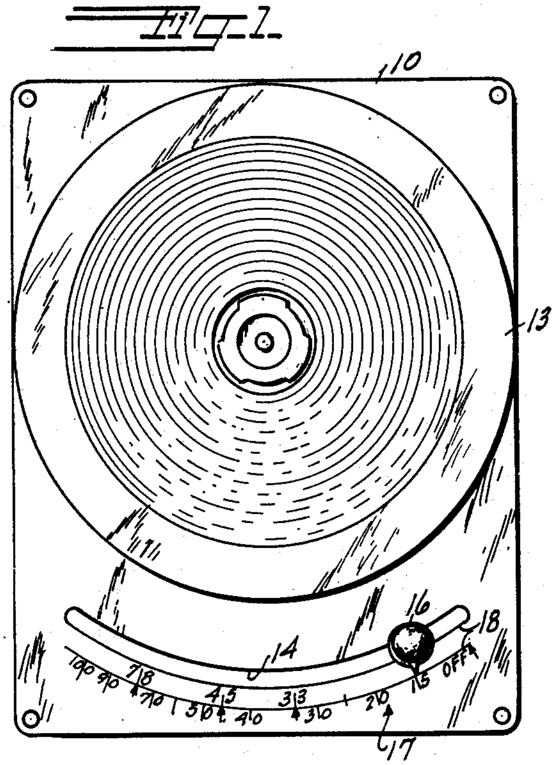
FIG. 1 is a top plan view of the invention.

The invention includes a base 10 having a turntable bearing 11 in which the turntable pivot 12 is rotatable and which supports the turntable 13. This base is provided with an arcuate slot 14 for the adjusting knob pivot 15 on which the adjusting knob is fixed, the adjacent portion of the arcuate slot being calibrated in speeds as indicated at 17 with ranges in speed downwardly to the "Off" position 18.

A motor 19 has a shaft extension which can be cylindrical or in the form of a tapered spindle 20 which terminates in a relatively sharp apex 21, the motor being mounted on top of the base and projecting downwardly through a passage 22 formed through the base and is supported by angle brackets 23 and 24 as indicated at 25 and 26.

A drive wheel supporting arm 27 terminates at its outer end in a depending portion 28 to which the stub shaft 29 for the drive wheel 30 is fixed, with the drive wheel rotatable on this shaft. The other end 31 of the drive wheel supporting arm is pivotally, resiliently, and adjustably supported by the base through the medium of a pivot 32 which extends through a slot 33 formed radially relative to the axis of the turntable 11.

This other end 31 is interposed between resilient washers 34 and 35 and which washers may be formed of live rubber or other suitable resilient material such as foam rubber or latex foam, to permit universal movement of the arm, to permit depression of the drive wheel to clear the undersurface of the turntable and retraction from the drive spindle when the control is moved to the "Off" position.

A drive wheel retraction arm 36 has one end fixed to the one end of the supporting arm 27 and has its outer ends 37 formed at a right angle, and a spring eye 38 projects from the opposite side of the supporting arm, and a tension spring 39 has one end anchored to the bracket 24 at 40 and the other end connected to the eye to resiliently urge the drive wheel into driving cooperation with the drive spindle.

A retraction lever 41 is pivoted to the base at 42 and is adjustable relative to the pivot through the slot 43 for changing the location of the fulcrum for varying and timing the operation of the related elements, and a tension spring 44 retains the lever in retracted position toward the drive wheel. The outer end of this lever 41 is formed downwardly at a right angle as indicated at 45 and this portion has a slot provided with a diagonal surface 46 under which the portion 37 of the drive wheel retraction arm rides when the control is moved to or from the "Off" position, to depress or release the drive wheel from contact with the undersurface of the turntable, further movement of the lever 41 retracting the drive wheel from the spindle, as indicated at 30′, retraction being assisted by the cam arm 48 on which the hub 49 rides.

The control lever 50 is pivoted at one end on the underside of the turntable bearing 11 as indicated at 51 and has the adjusting knob 16 attached to the other end through the slot 14, and at said one end has a pivotal connection 52 to the drive wheel retraction arm pivot 32 through the bracket 53 and connecting rod 54 which is adjustable in the bracket for adjusting the speed of the turntable to conform with the calibrations. A tongue 55 on the control arm is cooperative with the retraction lever 41, and a pin 56 is fixed intermediate the length of the control lever and engages securing means such as a clip 57 for releasably securing the control lever in the "Off" position.

Figure 2:
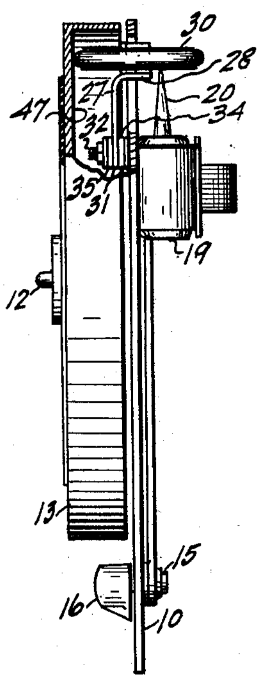
FIG. 2 is a side elevation of FIG. 1 with a portion broken away and shown in section to disclose the operation of the driving means.
Figure 3:
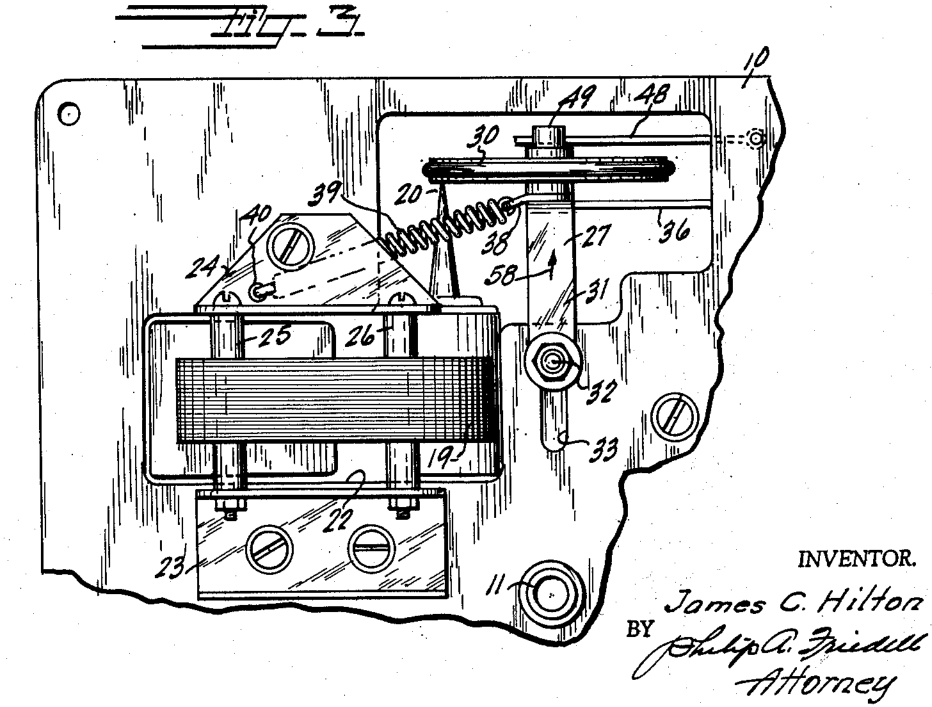
FIG. 3 is an enlarged fragmentary top plan view of the unit with the turntable removed.
Figure 4:
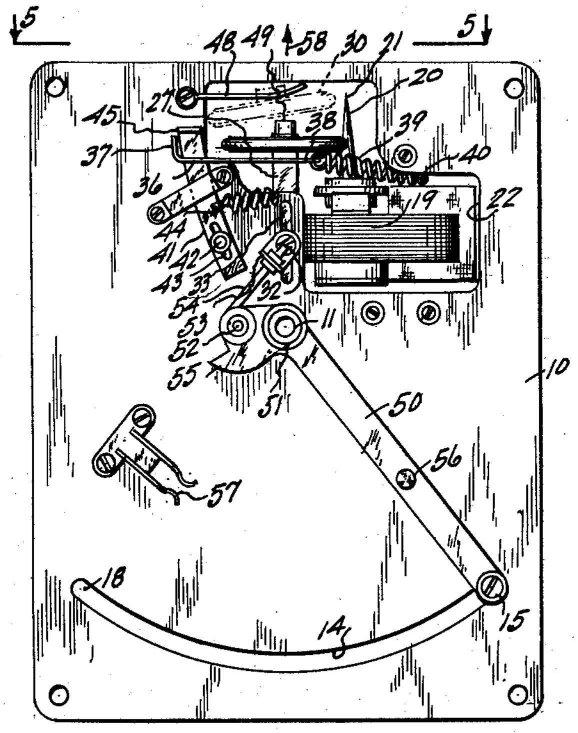
FIG. 4 is a bottom plan view of the invention.
Figure 5:
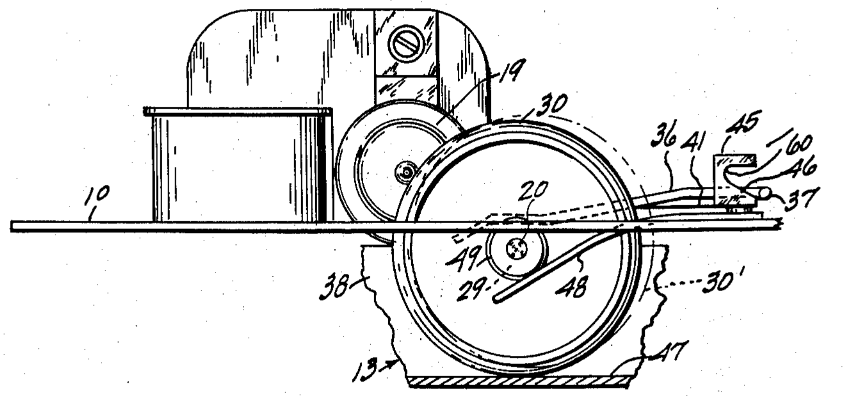
FIG. 5 is an enlarged fragmentary inverted view taken in the direction 5—5 on FIG. 4 and showing the drive wheel retracting means.

In FIGS. 1, 2 and 3, the control lever is shown close to the "Off" position, while in FIGS. 4 and 5 the control lever is shown in the maximum speed position.

As the control lever is moved from the maximum speed position, the drive wheel is moved radially outward in the direction of the arrow 58, with the retraction arm 36 riding on the retraction lever 41 until the portion 37 passes behind the depending portion 45 as indicated in FIG. 5, the drive wheel having reached a position close to the dotted position 30' in FIG. 4, at which time the tongue 55 cooperates with the end 59 of the retraction lever, swinging the outer end of this lever outwardly with the portion 37 riding downwardly on the decline 46 until it engages the bottom 60 of the recess, further movement of the control lever retracting the wheel which also rides downwardly on the cam arm 48, moving the drive wheel to the position indicated at 30' in FIGS. 4 and 5.

Obviously, it is possible to obtain a uniform variation in speed with a plain cylindrical drive shaft, creating variation in speed through adjustment of the drive wheel toward the axis of the turntable, however, the combination of the adjustable drive wheel with the tapered or conical shaft or spindle provides a dual or compound speed actuation, thereby providing a great range in speed with a minimum of adjustment.

With the drive shaft or spindle operating on a horizontal axis, and the drive wheel driving the turntable through its undersurface instead of through the inner periphery of the rim as is customary, a more efficient and accurate control is obtained in addition to acceleration from and deceleration to, the "Off" position, with complete freeing of the drive mechanism without resort to any type of circuit breaking device.

I claim:

1. In a phonograph turntable unit having a base having an underside and having a turntable pivot and a turntable removably mounted on said pivot and having a depending rim and an undersurface within said rim, and having a motor having a drive spindle, and a drive wheel cooperative between said drive spindle and said undersurface; speed changing and control means for said turntable comprising, a supporting arm having said drive wheel rotatably mounted on one end with the other end of the supporting arm having a pivotal mounting on the underside of said base, and the pivotal mounting being slidably adjustable radially in said base relative to the turntable pivot for adjusting the drive wheel on said undersurface relative to said rim for varying the speed of the turntable, spring means cooperative between the supporting arm and the base for normally maintaining cooperation between the drive wheel and the drive spindle, and a control lever having connection with said pivotal mounting and being pivotally mounted on the underside of said base for radially advancing and retracting said drive wheel relative to said rim,
- said control lever being movable to and from an "Off" position,
- cushioning members having the other end of the supporting arm interposed therebetween to provide for deflectional movement of the supporting arm for retraction from the said undersurface, and
- including means cooperative with the control lever and with the supporting arm, and
- including a cam member cooperative with the drive wheel
- when the control lever is moved to the "Off" position,
- for retracting the drive wheel from the undersurface, and
- coincidently retract the drive wheel from the spindle.

2. In a phonograph turntable unit having a base having an underside and having a turntable pivot and a turntable removably mounted on said pivot and having a depending rim and an undersurface within said rim, and having a motor having a drive spindle, and a drive wheel cooperative between said drive spindle and said undersurface; speed changing and control means for said turntable comprising, a supporting arm having said drive wheel rotatably mounted on one end with the other end of the supporting arm having a pivotal mounting on the underside of said base, and the pivotal mounting being slidably adjustable radially in said base relative to the turntable pivot for adjusting the drive wheel on said undersurface relative to said rim for varying the speed of the turntable, spring means cooperative between the supporting arm and the base for normally maintaining cooperation between the drive wheel and the drive spindle, and a control lever having connection with said pivotal mounting and being pivotally mounted on the underside of said base for radially advancing and retracting said drive wheel relative to said rim,
- a retraction lever pivotally mounted intermediate its length on the base, and having an outer end and an inner end,
- resilient means cooperative between the retraction lever and the base for normally maintaining the retraction lever in a position cooperatively related to the control lever,
- the outer end of said retraction lever having a depending cam member,
- a cam arm cooperative with said drive wheel during terminal and initial movements of said control lever relative to the "Off" position,
- a retraction arm cooperative with said supporting arm and controlled by said retraction lever,
- for respectively moving said drive wheel into and out of cooperation with said undersurface and said spindle when said control lever is moved respectively from and to its "Off" position.

3. In a turntable unit having a base, a turntable, and a pivotal mounting for the turntable, and a motor having a spindle, a friction wheel selectively cooperative with the spindle and with the undersurface of the turntable, and a control lever movable to and from an "Off" position,
- means for adjusting the speed of the turntable comprising
- a supporting arm having the drive wheel rotatably mounted on one end and with the other end mounted for radial adjustment relative to said pivotal mounting,
- a connection between said supporting arm and said control lever for radial adjustment thereof through movement of said control lever, and
- means actuated through operation of said control lever during initial and terminal movements relative to said "Off" position for respectively
- releasing the drive wheel for cooperation with the spindle and undersurface for driving the turntable, and
- retracting the drive wheel from driving cooperation with the spindle and undersurface for terminating operation of the turntable.

References Cited in the file of this patent

FOREIGN PATENTS

| | | |
|---|---|---|
| 1,040,972 | France | Oct. 20, 1953 |
| 1,133,804 | France | Apr. 2, 1957 |